(12) United States Patent
Bartelick et al.

(10) Patent No.: US 7,317,173 B2
(45) Date of Patent: *Jan. 8, 2008

(54) OVEN INCLUDING SMOKING ASSEMBLY IN COMBINATION WITH ONE OR MORE ADDITIONAL FOOD PREPARATION ASSEMBLIES

(75) Inventors: Janus Bartelick, Brown Deer, WI (US); William J. Hansen, Pewaukee, WI (US); Patrick A. Willis, Glendale, WI (US)

(73) Assignee: Alto-Shaam, Inc., Menomonee Falls, WI (US)

( * ) Notice: Subject to any disclaimer, the term of this patent is extended or adjusted under 35 U.S.C. 154(b) by 0 days.

This patent is subject to a terminal disclaimer.

(21) Appl. No.: 11/468,678

(22) Filed: Aug. 30, 2006

(65) Prior Publication Data

US 2006/0289441 A1 Dec. 28, 2006

Related U.S. Application Data

(63) Continuation of application No. 10/914,880, filed on Aug. 9, 2004, now Pat. No. 7,157,668.

(60) Provisional application No. 60/493,697, filed on Aug. 8, 2003.

(51) Int. Cl.
| | |
|---|---|
| A21B 1/24 | (2006.01) |
| A21B 1/26 | (2006.01) |
| A23B 4/44 | (2006.01) |
| A23B 4/56 | (2006.01) |
| A23L 1/31 | (2006.01) |

(52) U.S. Cl. ................. 219/401; 219/411; 99/467; 99/474; 99/482; 126/20; 126/21 A

(58) Field of Classification Search ............... None
See application file for complete search history.

(56) References Cited

U.S. PATENT DOCUMENTS

| | | | |
|---|---|---|---|
| 2,060,992 A | 11/1936 | Jackson | |
| 2,352,590 A * | 6/1944 | Trinkle | ............. 126/21 A |
| 2,640,414 A * | 6/1953 | Jensen | ............. 99/476 |
| 3,002,444 A | 10/1961 | Hoebing | |
| 3,173,357 A | 3/1965 | Nunnery | |
| 3,817,166 A | 6/1974 | McLain | |

(Continued)

FOREIGN PATENT DOCUMENTS

DE 25 08 794 9/1976

(Continued)

OTHER PUBLICATIONS

Alto-Shaam, Cooking, Holding, & Smoking Oven, Nov. 2003.

(Continued)

*Primary Examiner*—J. Pelham
(74) *Attorney, Agent, or Firm*—Quarles & Brady LLP

(57) ABSTRACT

An oven is disclosed having a first food preparation apparatus in the form of a convection heat source and/or a steam production assembly and/or a radiating heat source, and a second food preparation apparatus in the form of a smoking assembly. The oven can operate at least one of the food preparation apparatus simultaneously with the smoking assembly or separately from the smoking assembly.

12 Claims, 15 Drawing Sheets

U.S. PATENT DOCUMENTS

| | | |
|---|---|---|
| 3,887,716 A | 6/1975 | Seelbach |
| 4,126,087 A * | 11/1978 | McLamb ................... 99/327 |
| 4,344,358 A | 8/1982 | Maurer |
| 4,355,570 A | 10/1982 | Martin |
| 4,455,924 A * | 6/1984 | Wenzel ................... 99/333 |
| 4,467,709 A | 8/1984 | Anstedt |
| 4,474,107 A | 10/1984 | Cothran |
| 4,669,447 A | 6/1987 | Kelly |
| 4,856,422 A | 8/1989 | Meister |
| 5,501,142 A | 3/1996 | Bailey |
| 5,531,154 A | 7/1996 | Perez, III |
| 5,552,578 A | 9/1996 | Violi |
| 5,869,812 A | 2/1999 | Creamer et al. |
| 5,913,967 A | 6/1999 | Eisele |
| 5,950,527 A | 9/1999 | Marren et al. |
| 5,967,027 A | 10/1999 | Higashimoto |
| 6,012,381 A | 1/2000 | Hawn |
| 6,019,033 A | 2/2000 | Wilson et al. |
| 6,138,553 A | 10/2000 | Toebben |
| 6,142,066 A | 11/2000 | Anders et al. |
| 6,152,024 A | 11/2000 | Tippmann |
| 6,188,045 B1 | 2/2001 | Hansen et al. |
| 6,350,965 B2 * | 2/2002 | Fukushima et al. ......... 219/401 |
| 6,868,777 B1 | 3/2005 | Higgins et al. |
| 6,962,106 B2 | 11/2005 | Viraldo |
| 2005/0204934 A1 | 9/2005 | Robertson |

FOREIGN PATENT DOCUMENTS

| | | |
|---|---|---|
| DE | 7909941 U1 | 9/1979 |
| DE | 100 21 235 A1 | 10/2001 |
| EP | 0 244 538 A2 | 11/1987 |
| FR | 2302484 | 9/1976 |

OTHER PUBLICATIONS

Supplementary European Search Report, Jun. 13, 2007.

* cited by examiner

OVEN INCLUDING SMOKING ASSEMBLY IN COMBINATION WITH ONE OR MORE ADDITIONAL FOOD PREPARATION ASSEMBLIES

CROSS-REFERENCE TO RELATED APPLICATIONS

This application is a continuation of U.S. Utility patent application Ser. No. 10/914,880 filed Aug. 9, 2004, now U.S. Pat. No. 7,157,668 which claims the priority of U.S. Provisional Patent Application No. 60/493,697, filed Aug. 8, 2003, the disclosures of which are hereby incorporated by reference as if set forth in their entirety herein.

BACKGROUND OF THE INVENTION

The present invention relates generally to a cooking apparatus, and in particular to a commercial oven capable of performing multiple food preparation processes.

Conventional steamers are suitable for preparing various food types by introducing steam into a cooking chamber to cook the food via convection. In particular, a water supply is typically introduced in the cooking chamber and delivered to one or more heating elements that evaporate the water into steam. A fan in the heating cavity circulates the steam throughout the cooking cavity. Alternatively, if a water supply is not used, the heating elements can be used to cook the food product via forced air convection. Foods suitable to be prepared by steam and convection include vegetables as well as meat, poultry, and fish products. It should be appreciated that the term "meat" is used herein to refer generally to meat, poultry, fish, and the like for the purposes of clarity and convenience.

Conventional smokers are typically used to introduce flavored smoke into a cooking chamber, which will permeate the meat with a distinctive taste. Smokers can be used to either fully cook raw meat product, complete cooking a meat product that has been partially cooked previously in, for example a steamer or convection oven, or merely add additional flavor to a meat product that has already been fully cooked. Conventional smokers are currently available as regular smokers and pressure smokers.

A regular smoker provides a smoke generator in the cooking chamber. The smoke generator includes wood chips or other flavor producing ingredients that may be charred upon activation of an igniter. Regular smokers operate generally at or slightly above atmospheric pressure.

A pressure smoker is one whose cooking chamber is connected to a smoke producing unit via a supply tube. The smoker unit thus produces smoke in large quantities, and introduces the smoke into the cooking chamber via the supply tube at a rate sufficient to maintain the pressure inside the cooking chamber at a predetermined level, for example 3 PSI. It should thus be appreciated that the elevated internal pressure of a pressure smoker can cook raw meat product significantly faster than a regular smoker.

However, regardless of the type of smoker used to prepare a raw meat product, the food preparation can consume a significant length of time that is impractical in some circumstances. If one wishes to reduce the cooking time, while producing a prepared meat product having smoked flavor, the raw meat product would first be prepared or partially prepared in a steamer or convection oven. The meat product would then be transferred into a conventional smoker to complete the food preparation sequence. This, however, is a tedious and cumbersome process. Furthermore, conventional smokers do not provide a mechanism for preparing food products that are not desired to be smoke-flavored, such as vegetables.

It is thus desirable to provide an oven that is suitable for cooking raw food products using a heat source capable of preparing raw meat product faster than smoking alone (e.g., convection, steam, or radiation) while simultaneously being capable of introducing flavored smoke to the food product being cooked.

BRIEF SUMMARY OF THE INVENTION

In one aspect, the present invention provides an oven capable of preparing food product utilizing a first and second food preparation process. The oven includes a heating cavity defining an interior including an apparatus for supporting food product disposed therein. A door provides selective access to the interior. A first food preparation assembly is operable to prepare raw food product using at least one of 1) radiating heat in combination with a rotisserie assembly, 2) steam, and 3) forced air convection. A smoking assembly is also provided and configured to deliver heat to an aromatic smoke producing media that emits smoke into the heating cavity in response to the delivered heat. The oven is capable of operating the first food preparation assembly simultaneously with the smoking assembly or separately from the smoking assembly.

The foregoing and other aspects of the invention will appear from the following description. In the description, reference is made to the accompanying drawings which form a part hereof, and in which there is shown by way of illustration, and not limitation, a preferred embodiment of the invention. Such embodiment does not necessarily represent the full scope of the invention, however, and reference must therefore be made to the claims herein for interpreting the scope of the invention.

DETAILED DESCRIPTION OF THE PREFERRED EMBODIMENT

Figure 1:
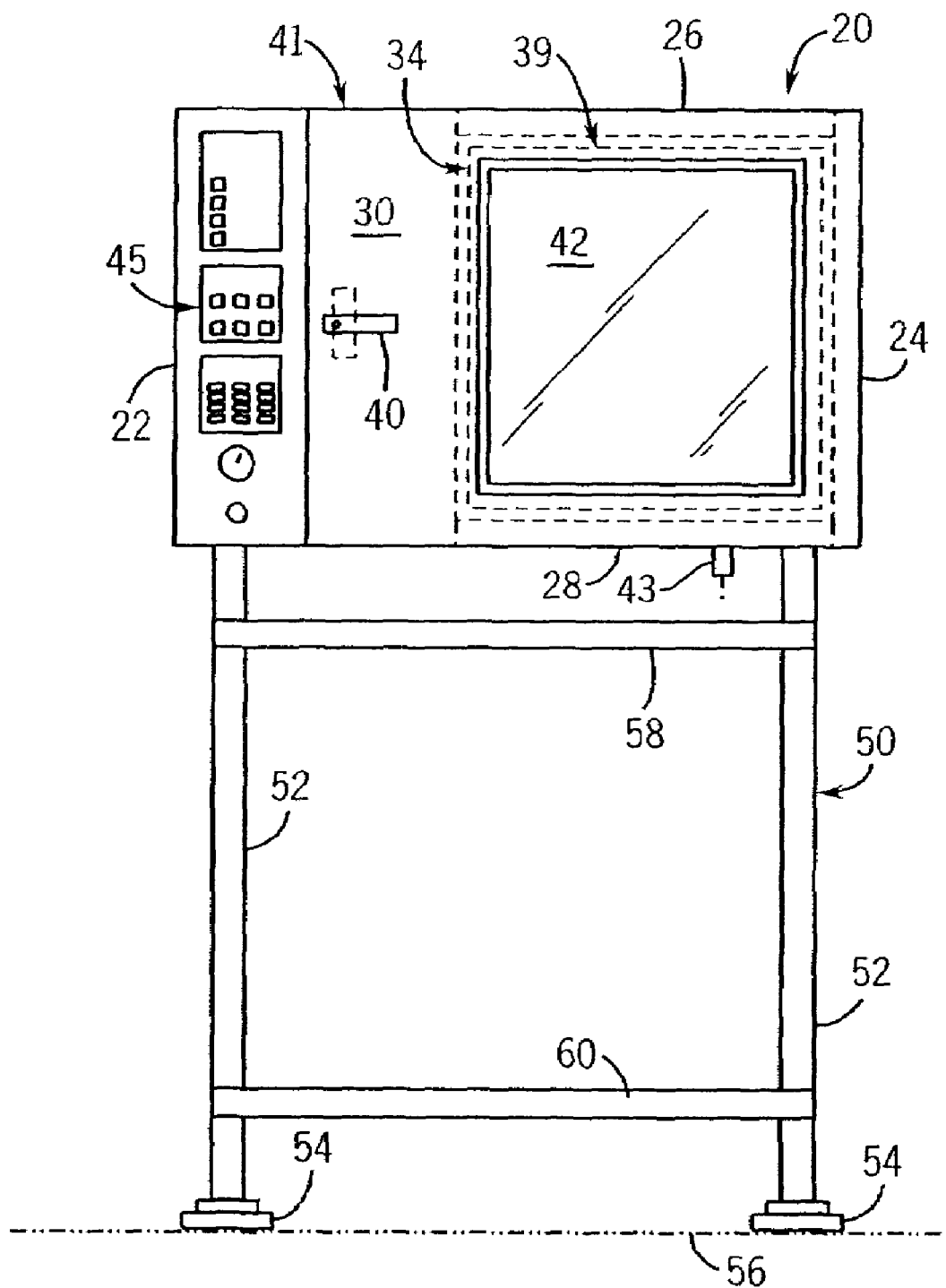
FIG. 1 is a schematic side elevation view of a commercial oven constructed in accordance with the preferred embodiment.
Figure 2:
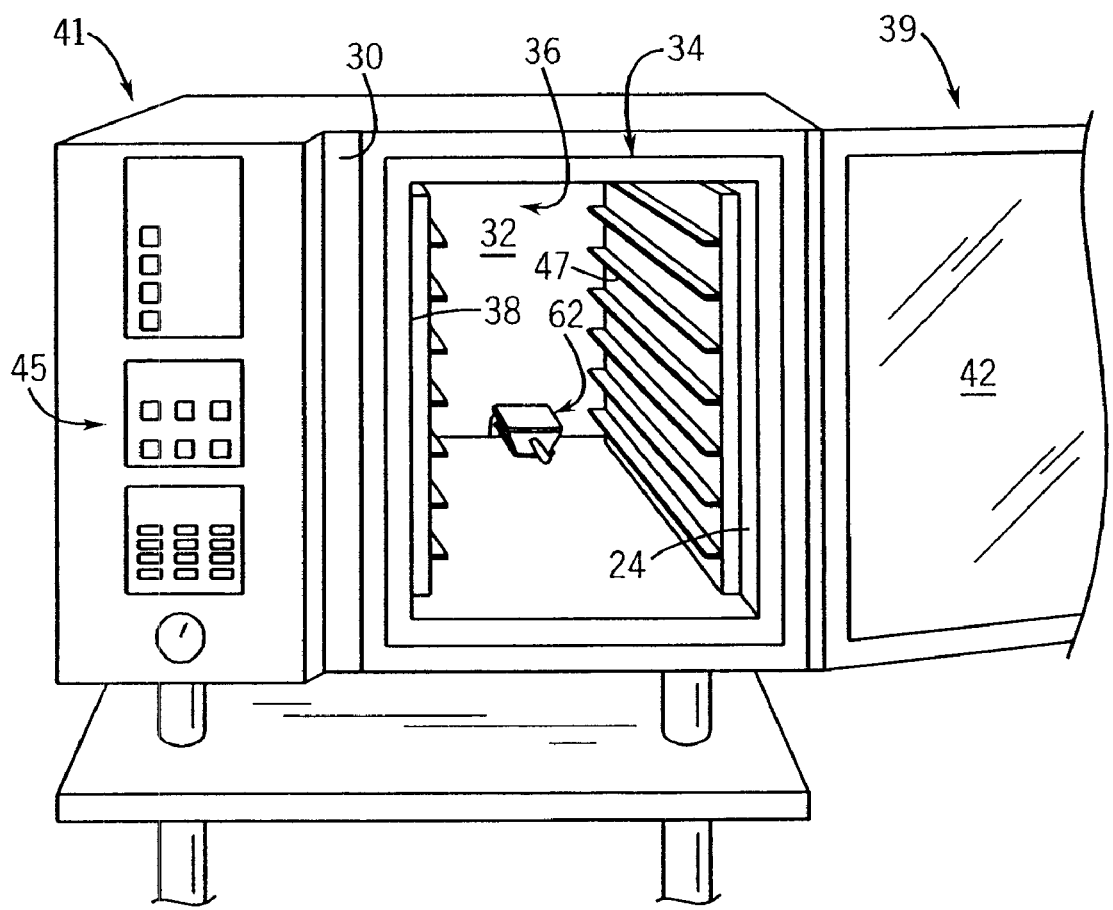
FIG. 2 is a perspective view of the interior of the oven schematically illustrated in FIG. 1.

Referring initially to FIGS. 1-4, a commercial oven 20 includes a left side wall 22 and opposing right side wall 24 that are connected to their upper and lower ends by an upper wall 26 and a base 28. Side walls 22 and 24 and upper and lower walls 26 and 28 are connected at their front and rear ends to a front end wall 30 (including a door 39) and rear end wall 32, respectively. Oven 20 encases a generally rectangular cooking chamber 34 whose interior 36 defines a heating cavity.

Heating cavity 36 is generally defined by front and rear oven walls 30 and 32, respectively, and right side wall 24. The left end of heating cavity 36 is bound by an internal left side wall 38 that extends parallel to outer left side wall 22. Left cavity side wall 38 is offset from left oven side wall 22 by a sufficient distance in order to provide a housing 41 for various oven controls and electronics 45, including among other things timer and temperature controls to operate a cooking sequence in accordance with the present invention. The front end of heating cavity 36 is defined by door 39 which is hingedly connected to right side wall 24, that and can be opened and closed via a traditional handle 40 to provide access to the heating cavity 36. A transparent panel 42 is embedded within door 39 to enable visible access to the heating cavity 36 when the door is closed.

A plurality of racks 44 is supported by a corresponding plurality of rack supports 47 extending inwardly from left and right side walls 24 and 38. Racks extend horizontally between side walls 24 and 38, and support food product 46 to be prepared that is delivered into cavity 36, and facilitate removal of the food product from cavity 36 upon completion of the cooking sequence. A drain assembly 43 extends downwardly from base 28 and enables excess moisture and grease produced as food product 48 is cooked during operation to be expelled from heating cavity 36.

Oven 20 can be supported by a support stand 50 including a plurality of vertical legs 52 that extend downwardly from base 28 and terminate at feet 54 that rest on a surface, such as a kitchen floor 56. Support stand 50 further includes a plurality of upper rails 58 connecting the upper ends of legs 36 proximal base 28. A flat rectangular plate 60 can be connected to the lower ends of legs 52 at a location slightly upwardly of feet 54. Plate 60 and rails 58 enhance the stability of support stand 50.

In accordance with the preferred embodiment, oven 20 includes a smoker assembly 62 operable to introduce flavored smoke into heating cavity 36 to be absorbed by food product 46. Smoker assembly 62 can be used alone to cook raw food product, or can be used with a convection heat source, including forced air and/or steam, and/or a radiation heat source as will be described in more detail below.

Referring now also to FIGS. 3-7, smoker assembly 62 extends into heating cavity 36 preferably from rear wall 32. Specifically, smoker assembly 62 includes a pair generally cylindrical side-by-side heating elements 88 extending outwardly from rear wall 32. Heating elements 88 can include a resistive coil that generates heat in response to the introduction of an electric current, and delivers the heat to an aromatic smoke producing media. Alternatively, heating elements 88 can be capable of producing a momentary spark or flame sufficient to ignite a combustible aromatic media. Smoker assembly 62 further includes a horizontally disposed cradle 87 in the form of a U-shaped bar 86 extending outwardly from rear wall 32 and into heating cavity 36. Cradle 87 is mounted to wall 32 at a position such that heating elements 88 is disposed slightly above cradle 87, and laterally centered between the side members of bar 86.

Smoker assembly 62 includes a smoking media tray 64 having a base 66, upstanding side walls 68 and end walls 70 and 71 that collectively define an internal cavity 72 having an open upper end. Side walls 68 also extend slightly outwardly from base 66, and fit inside cradle at their lower ends. A cover 74 is hingedly attached to the upper end of one of the end walls 70 (or alternatively side walls 68) and is sized to selectively open and close the cavity 72. A handle 76 extends outwardly from end wall 71 such that cover 74 swings away from handle 76 when the cavity 72 is opened. A plurality of smoke vents 78, in the form of elongated apertures extending through side walls 68 and end wall 71, enable smoke to be released from tray 64 during operation. A pair of round apertures 80 extends through end wall 70 and is sized to receive heating elements 88.

Figure 6:
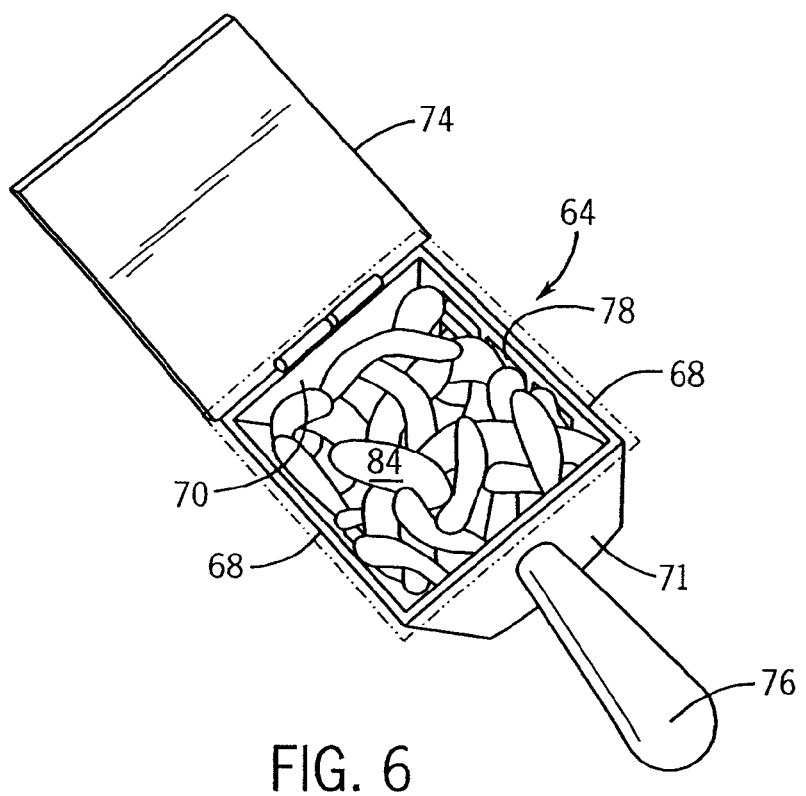
FIG. 6 is a perspective view of the smoker tray illustrated in FIG. 5 containing smoke-producing aromatic media.
Figure 7:
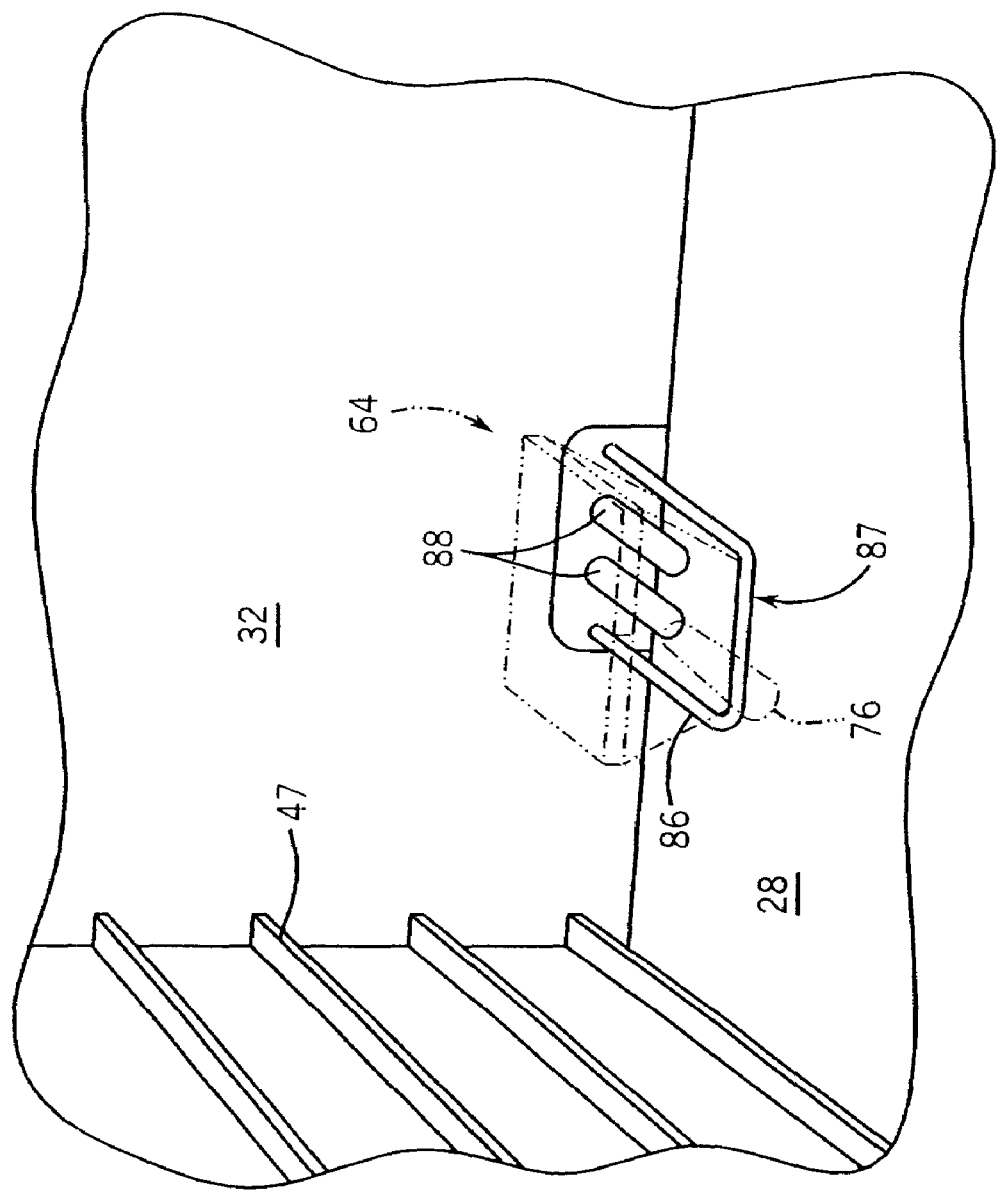
FIG. 7 is a perspective view of a smoker tray illustrated in FIG. 6 in a closed position and mounted onto a tray support and igniter apparatus constructed in accordance with the preferred embodiment.

Referring now also to FIG. 6, a aromatic smoke producing media, such as wood chips 84 (which can be flavored as desired), is disposed in tray 64. Wood chips 84 are the type that char and emit flavored smoke when exposed to fire or extreme heat. Chips 84 produce a higher volume of smoke when wet or damp, as known to one of ordinary skill in the art.

During operation, tray 64 is placed in cradle 87 such that heating elements 88 extend through corresponding apertures 80. Wood chips are placed in tray 64 and wetted with water, if desired, either before or after tray is placed in cradle 87. Cradle cover 74 is then closed. Accordingly, when power is supplied to heating elements 88 (e.g., via controls 45), the temperature of the heating elements increases, thereby imparting heat to the wood chips 74 which, in turn, char and produce flavored smoke that is expelled via smoke vents 78 into cavity 36. The smoke can be produced for as long as desired until the food product has been prepared as desired.

Advantageously, tray 64 can be easily removed from cavity 36 once the smoking process has been completed or if, for instance, one desires to prepare a food product, such as vegetables, via a non-smoking food preparation method enabled by oven 20, such as convection and/or radiation.

Figure 3:
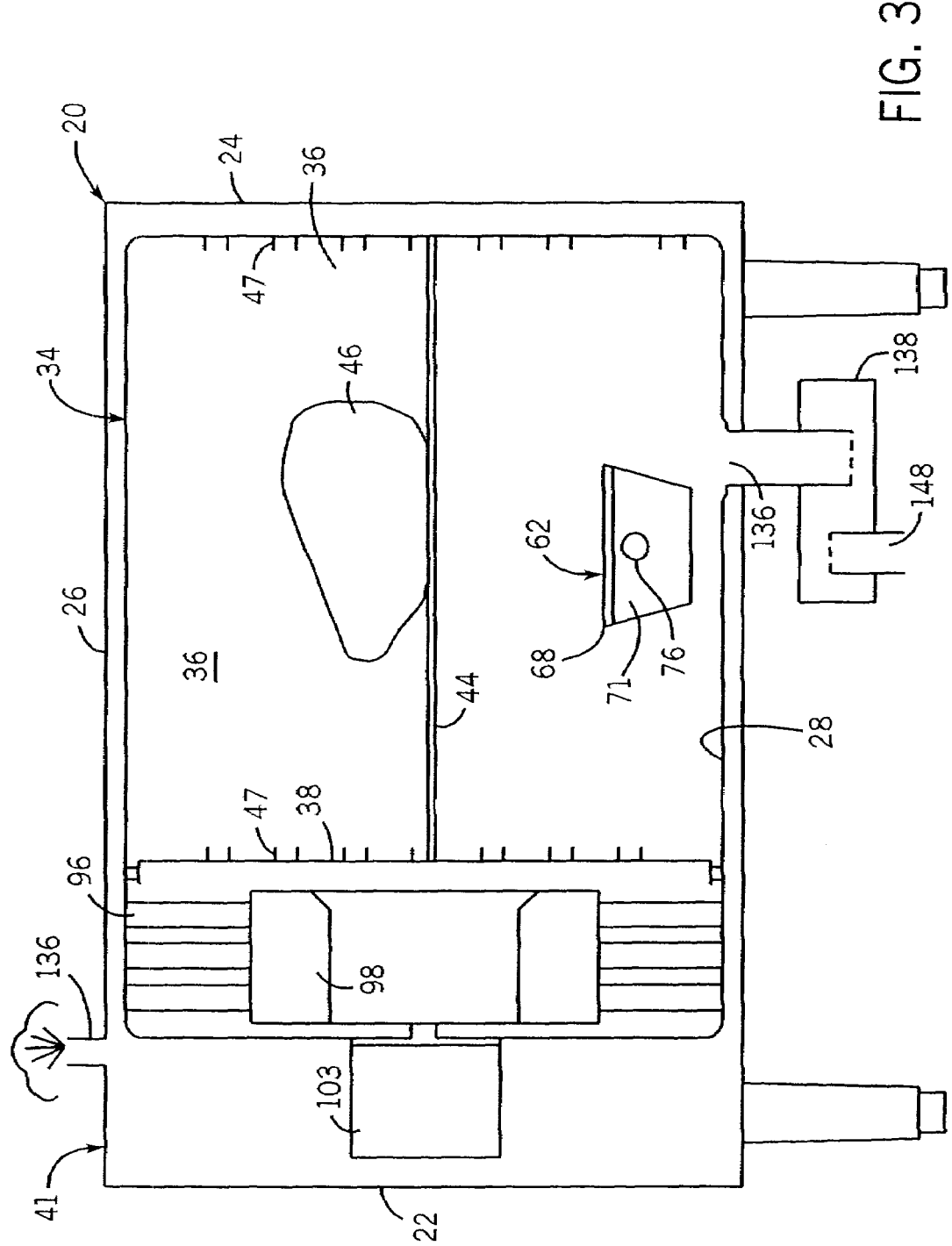
FIG. 3 is a simplified schematic illustration of various components of the oven illustrated in FIG. 2 illustrating a smoker assembly and a forced air convection assembly constructed in accordance with the preferred embodiment.
Figure 4:
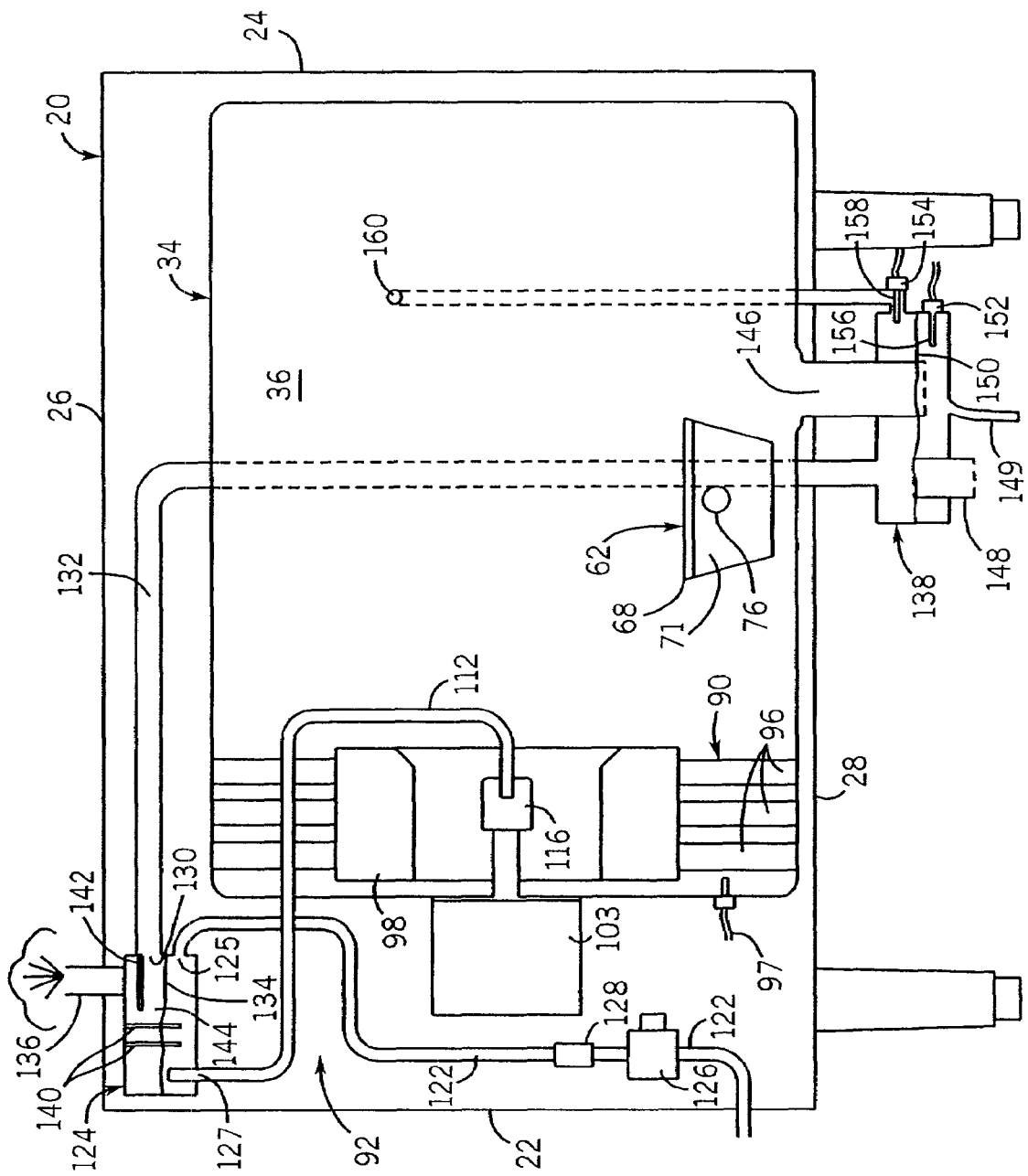
FIG. 4 is a more detailed illustration of the components of the oven illustrated in FIG. 3 further including a steam producing assembly.
Figure 5:
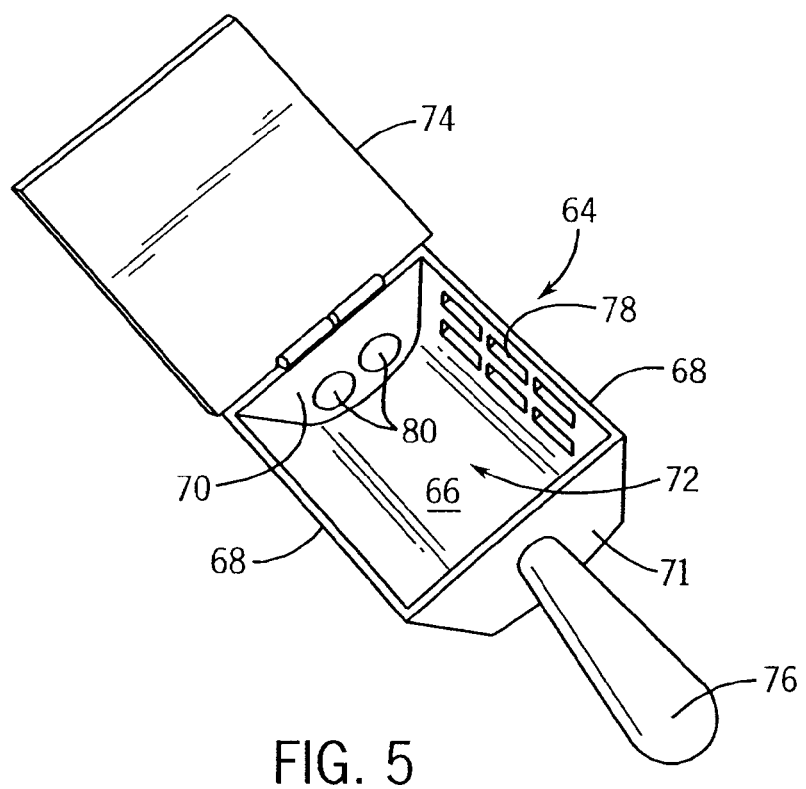
FIG. 5 is a perspective view of a smoker tray constructed in accordance with the preferred embodiment, configured in an open position.
Figure 8:
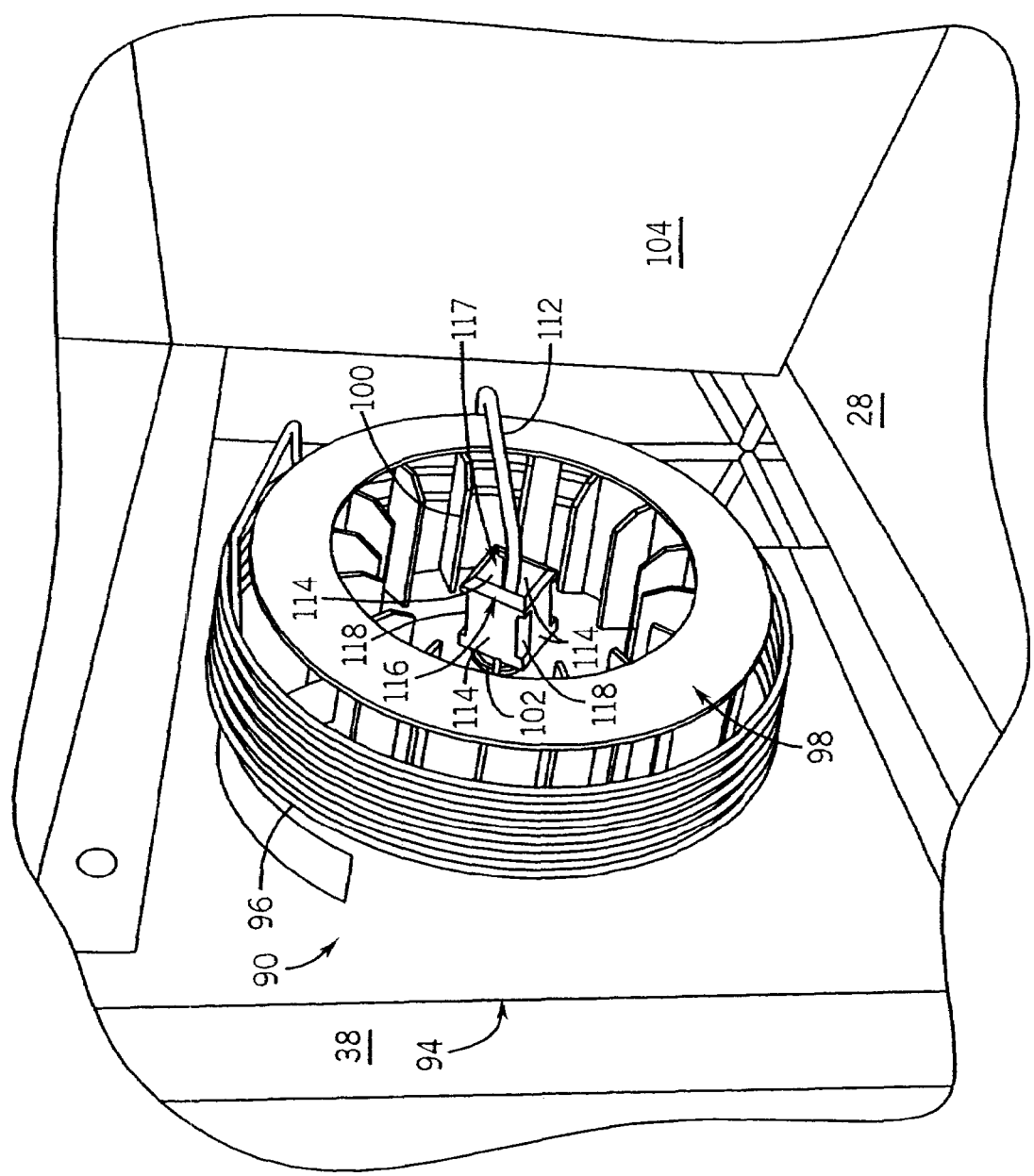
FIG. 8 is a perspective view of a boilerless convection heating assembly using resistive coil heating elements in combination with a steam producing assembly constructed in accordance with the preferred embodiment.

Referring now to FIGS. 3, 4, and 8, the present invention recognizes that oven 20 can include, along with smoker assembly 62, a convection heating assembly 90 that is configured to rapidly cook food product 46 concurrently with, or separately from, activation of smoker assembly 62. Heating assembly 90 is mounted onto left side wall 38, and specifically in a rectangular recess formed in wall 38, and includes a radial fan 98 having blades 100 that rotate about a hub 102 under power supplied to a fan motor 103 disposed in housing 41. A heating element in the form of an electric resistive coil 96 defines a loop that surrounds fan blades 100. Accordingly, during operation, heating assembly 90 can be used to cook a food product via convection by supplying a current to resistive coil 96 while rotating fan blades 100 to disperse the heated air throughout heating cavity 36. A temperature sensor 97 is mounted to wall 38 at a location proximal coils 96 and is sensed by controls 45 to adjust the power supply to coils 96 and regulate the temperature in heating cavity 36.

The present invention further recognizes that heating assembly 90, in addition to preparing food via forced air convection, can cook food product 46 by circulating steam inside cavity 36. Accordingly, a steam producing assembly 92 is provided for introducing a fluid such as water to the heating elements 46 during operation of heating assembly 90. Coils 96 vaporize the water into steam, which is circulated throughout the heating cavity 36 by rotating fan 98.

Referring now to FIGS. 4 and 8 in particular, steam producing assembly 92 operates in combination with a pressure compensation tank 124 disposed proximal the intersection between left side wall 22 and upper wall 26. Tank 124 serves multiple purposes, including venting excess pressure that accumulates in cavity 36 during food preparation, as is described in more detail below. Assembly 92 includes a fluid intake line 122 having a first end connected to a fluid source, such as a conventional faucet or the like, a main body portion extending through left side wall 22, and a second end connected to an inlet 125 formed in a side wall of pressure compensation tank 124.

Fluid flow through intake line 122 is controlled by a solenoid valve 126 that is activated by controls 45 to inject water into pressure compensation tank 124 as needed. A water flow regulator 128 is coupled to intake line 122 at a location downstream of valve 126, and defines an internal throughway having a diameter sized less than that of line 122 to meter the water flow rate when valve 126 is open. Water thus flows at a predetermined flow rate into inlet 125 of pressure compensation tank 124.

A pressure compensation tank inlet 127 is formed in the base of the pressure compensation tank 124, and accommodates the inlet end of a fluid delivery line 112. Delivery line 112 further includes a main body portion extending through any suitable wall, such as side wall 38, rear wall 32, or front wall 30, and into heating cavity 36, and defines an outlet end disposed proximal fan hub 102. Conduit 112 thus enables water to travel from tank 124 to fan 98, where it is forced across heating elements 96 and vaporized into steam as will now be described.

In particular, a water atomizer 116 of the type described in U.S. Pat. No. 6,188,045, the disclosure of which is hereby incorporated by reference as if set forth in its entirety herein, is disposed at the hub 102 of fan 98 and therefore rotates during fan operation. Atomizer 116 includes four adjoined rectangular side walls 114 that define an open outer end 117 receiving the outlet end of fluid delivery line 112. An elongated slot 118 extends through atomizer 116 at each interface between adjacent side walls 114 such that water entering the atomizer 116 via line 112 is slung through slots 118 under centrifugal forces generated during fan rotation. The water exiting atomizer 116 is directed over heating elements 96 that vaporize the water into steam that is circulated through cavity 36.

Figure 9:
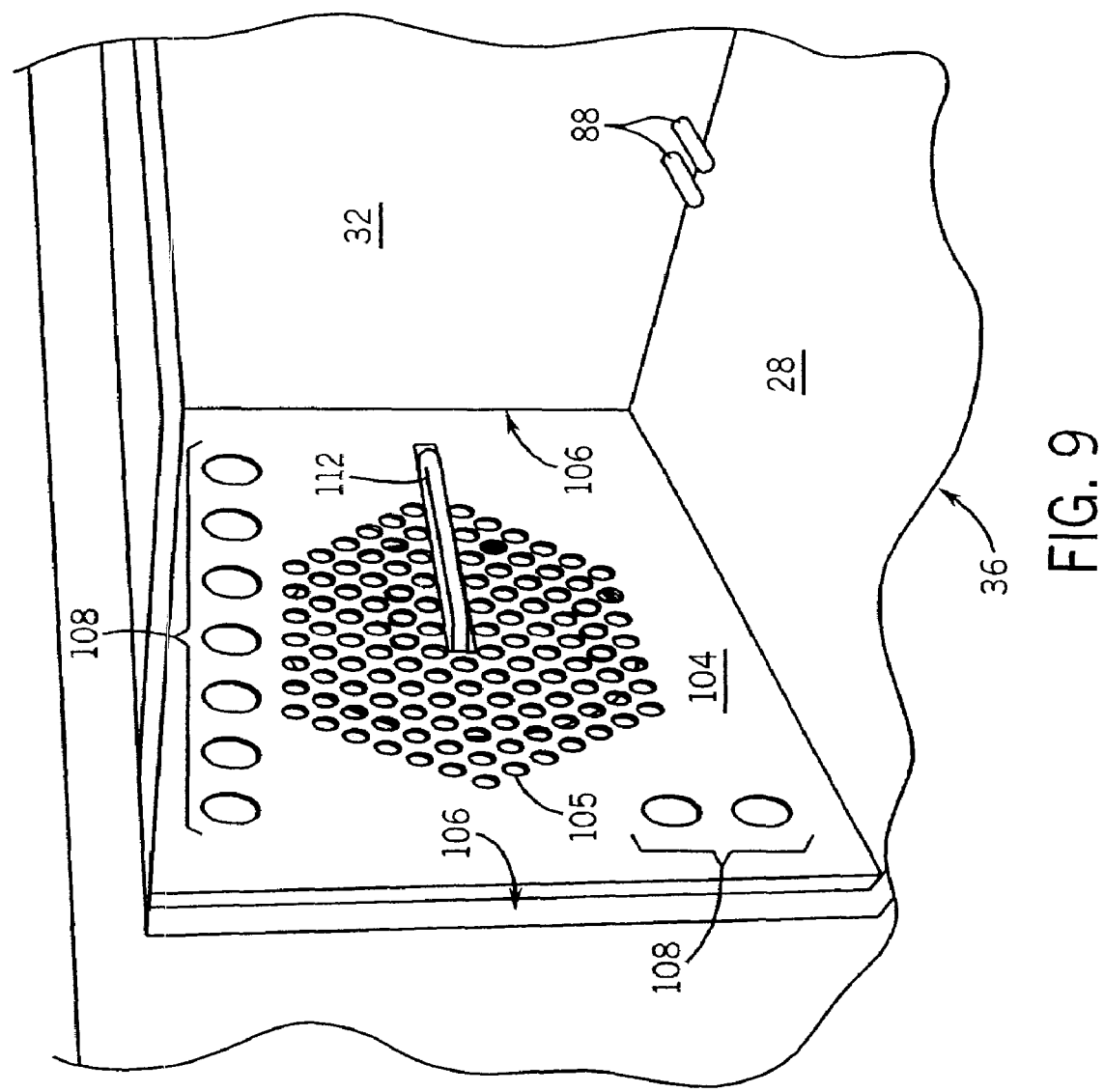
FIG. 9 is a perspective view of the heating assembly illustrated in FIG. 8 including a plate disposed in a closed position.

Referring also to FIG. 9, heating assembly 90 further includes a cover 104 that is hingedly attached to side wall 38, and that can be opened and closed to provide access to the components of heating assembly 90. A plurality of apertures 108 extends through cover 104 that provide avenues for steam and heated air to flow into cavity 36 for the purposes of heating food product 46. Furthermore, because cover 104 does not span laterally the entire distance of recess 94, a pair of vertically extending gaps 106 are disposed between the cover 104 and left side wall 38 on both lateral sides of fan 98 to provide additional airflow outlets. A grill 105 is axially aligned with fan hub 102 that presents openings extending through cover to provide an air intake for fan 98. Cover 104 further includes a horizontal slot that accommodates fluid delivery line 112.

Figure 10:
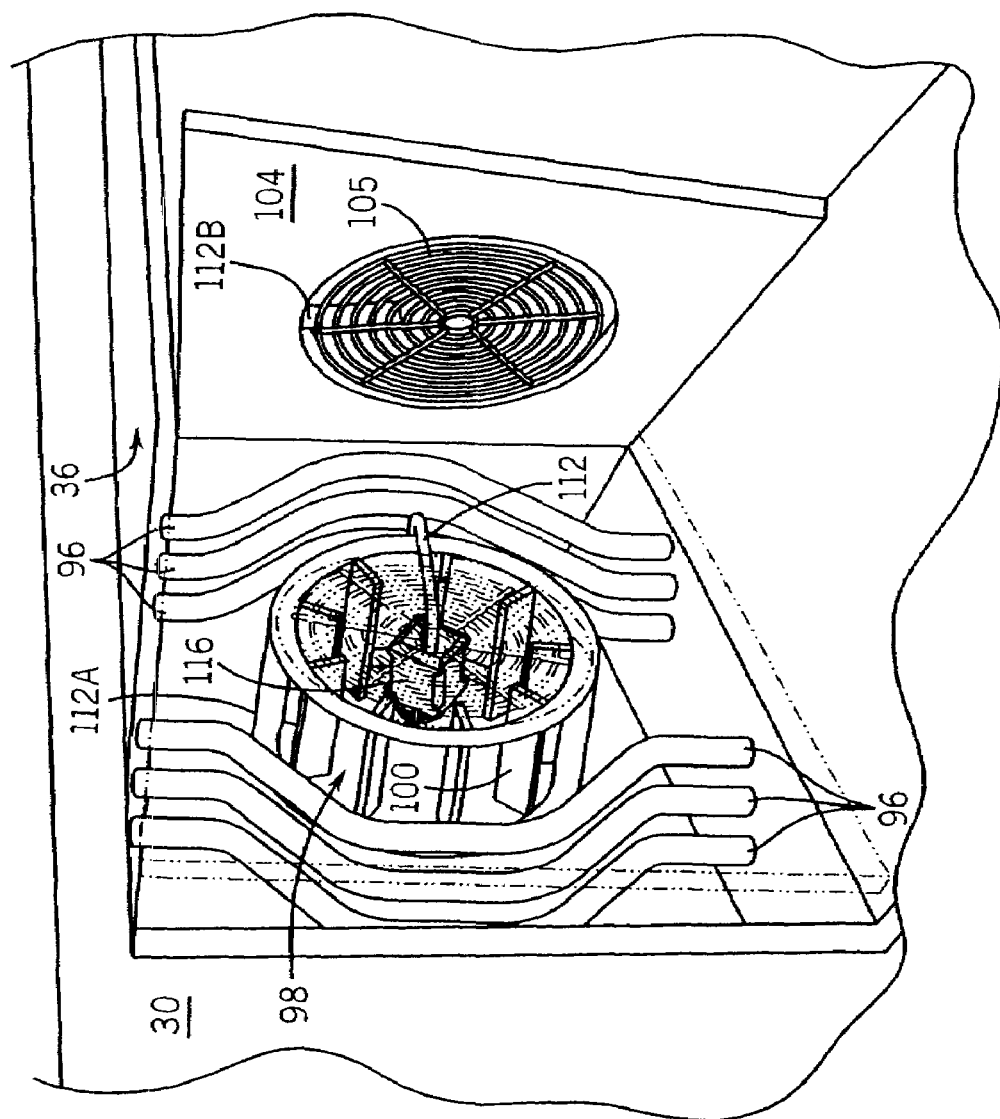
FIG. 10 is a perspective view of a convection heating assembly similar to the assembly of FIG. 8 but using heat exchangers receiving heated air from gas burners in accordance with an alternate embodiment.

Referring now to FIG. 10, the present invention anticipates that heating assembly 90 can use resistive coils 96 in the manner described above to heat food product 46, or alternatively can rely on a gas burner to supply the necessary heat for convection or steam cooking. A gas burner (not shown) can thus be provided at any desirable local ion having an outlet conduit in fluid communication with a plurality of heating elements 96 in the form of vertical heat exchanging tubes that largely surround fan 98 and receive hot combustion gasses from the gas burner. As fan 98 rotates, air from cavity 36 enters assembly 90 through grill 105 and is forced across heating elements 96, becomes heated, and is directed towards food product 46.

Heating assembly 90 illustrated in FIG. 10 can also provide a steamer as described above. Specifically, fluid delivery line 112 includes an intake section (not shown in FIG. 10) connected to an outlet section 112B that extends through cover 104. Outlet section 112B extends through grill 105 to deliver water to hub 102. A water dispersion apparatus 116' receives the water from outlet section 112B and flings the received water towards fan blades 100, which forces the water over heating elements 96 to produce steam as described above.

Accordingly, during operation, fan blades 100 rotate to draw air into the fan 98 via intake grill 105. Water is additionally supplied to atomizer 116 via fluid delivery line 112. The delivered water is expelled radially outwardly from atomizer 116 or via slots 118 (or alternative suitable apparatus) as the fan 98 rotates, and directed via fan blades 100 towards heating elements 96 before being expelled into the heating cavity 36 via air outlets 108 as steam that heats the food product 46. The heating elements 96 may be resistive elements or heat exchangers receiving the output of gas burners. It should be appreciated that convection heating assembly 90 is capable of cooking food product 46 via convection both alone and in combination with smoker assembly 62.

It should be appreciated that either of the steam producing apparatus described above can be used with either heating assembly 90 illustrated and described with reference to FIGS. 8-10. It should be further appreciated that convection assembly 90 can exist without steam producing assembly 92 and heat food product 46 using hot air rather than steam.

Referring again to FIG. 4, the components and operation of pressure compensation tank 124 will be described in more detail. Specifically, tank 124 includes a tank overflow outlet 130 that extends through a tank sidewall at a location above tank inlet 125. Conduit inlet 127 terminates inside tank 124 at a vertical location between overflow outlet 130 and tank inlet 125. The water level 134 of pressure compensation tank 124 is thus disposed between the inlet end of conduit 112 and overflow outlet 130 during normal operation. Accordingly, additional water added to tank 124 flows into conduit 112 and travels to the convection assembly 90 to be vaporized into steam and delivered to the food product 46 as described above. If the flow rate of water entering tank 124 exceeds the flow rate of water to convection assembly 92, the water level will rise to a level above inlet to conduit 112 and even with overflow outlet 130. The excess water will then drain into overflow conduit 132 via overflow outlet 130, and flow into a condensation tank 138 located below heating cavity 36.

Condensation tank 138 defines a generally rectangular housing having an open upper end that receives excess moisture, grease, and the like that is produced when preparing food product 46, via a conduit 146 coupled to drain 43 and extending below oven base 28.

A fluid supply tube 149 is connected at one end to a cool water source, and connected at its opposite end to an inlet formed in the base of tank 138 to supply cool water to the tank during operation. A drain assembly outlet 148 extends upwardly through the bottom of condensation tank 138 a sufficient distance such that the terminal end of outlet 148 is disposed slightly above the terminal end of conduit 146. A water level 150 is thus produced in tank 138 that ensures that the outlet of conduit 146 is submersed. Advantageously, a closed system is therefore provided that prevents flavor-filled gasses and smoke produced during a food preparation sequence from flowing out of heating cavity 36 during normal operation. It should be appreciated, however, that drainage could alternatively be achieved in accordance with conventional techniques and allow gasses to escape, thereby creating an open system.

Condensation tank 138 further includes a water temperature sensor 152 and a steam temperature sensor 154. Water temperature sensor 152 includes a probe 156 extending into tank 138 at a level below the inlet to conduit 148 such that it is submersed in water. Steam temperature sensor 154 includes a probe 158 extending into tank 138 at a level above the inlet to conduit 148 and a gas bypass tube 160 extending from a location inside cavity 36 that terminates at a location proximal probe 158. Steam in cavity therefore flows along bypass tube 160 and is brought into contact with probe 158 to enable a steam temperature measurement for cavity 36.

When the water temperature sensor exceeds a predetermined threshold (between 70 C. and 80 C., and more preferably 76 C. in accordance with the preferred embodiment), controls 45 inject additional cool water into tank 138 via a conventional valve (not shown) disposed in intake tube 149. As a result, steam that is brought into proximity of the water inside tank 138 will condense and drain through conduit 148 as a liquid.

If the steam temperature is greater than a predetermined threshold (between 80 C. and 100 C., and more preferably 90C. in accordance with the preferred embodiment), controls 45 actuate valve 126 to discontinue water supply to steam producing assembly 92 until the steam temperature falls below a predetermined threshold. Additionally, controls can automatically decrease the power supplied to heating elements 96 until the steam temperature falls below the predetermined threshold.

Tank 138 further enables venting of excess pressure generated inside cavity 36 during operation. Specifically, as steam, smoke, and other gasses accumulate in heating cavity 36 during a food preparation sequence, the pressure of cavity 36 correspondingly accumulates. Once the cavity pressure reaches a predetermined threshold, the pressurized steam, smoke, and other gasses flow through conduit 146 and momentarily displace the water in tank 138. Some of the gasses (i.e., steam) condenses in the tank 138 and exits tanks 138 via conduit 148 as water, while the remaining gasses follow the path of least resistance of conduit 132. The gasses then flow into pressure compensation tank 124, through an outlet channel 144, and exit the oven at a vent 136 formed in the upper surface of tank 124. It should be appreciated that the tank pressure required to begin venting is primarily determined based on the depth between the terminal ends of conduits 146 and 146, and hence the water level in condensation tank 138.

Outlet channel 144 is defined by a pair of vertical baffles 140 extending down from the upper surface of tank 124 to a distance below water level 134 to assist in pressure dissipation. Channel 144 is further defined by a horizontal baffle 142 disposed between outlet 130 and vent 136. Horizontal baffle 142 extends from the right side wall of tank 124 to a location short of baffles 140. Accordingly, gas outlet channel 144 extends from overflow outlet 130, around horizontal baffle 142, and towards vent 136.

Figure 23A:
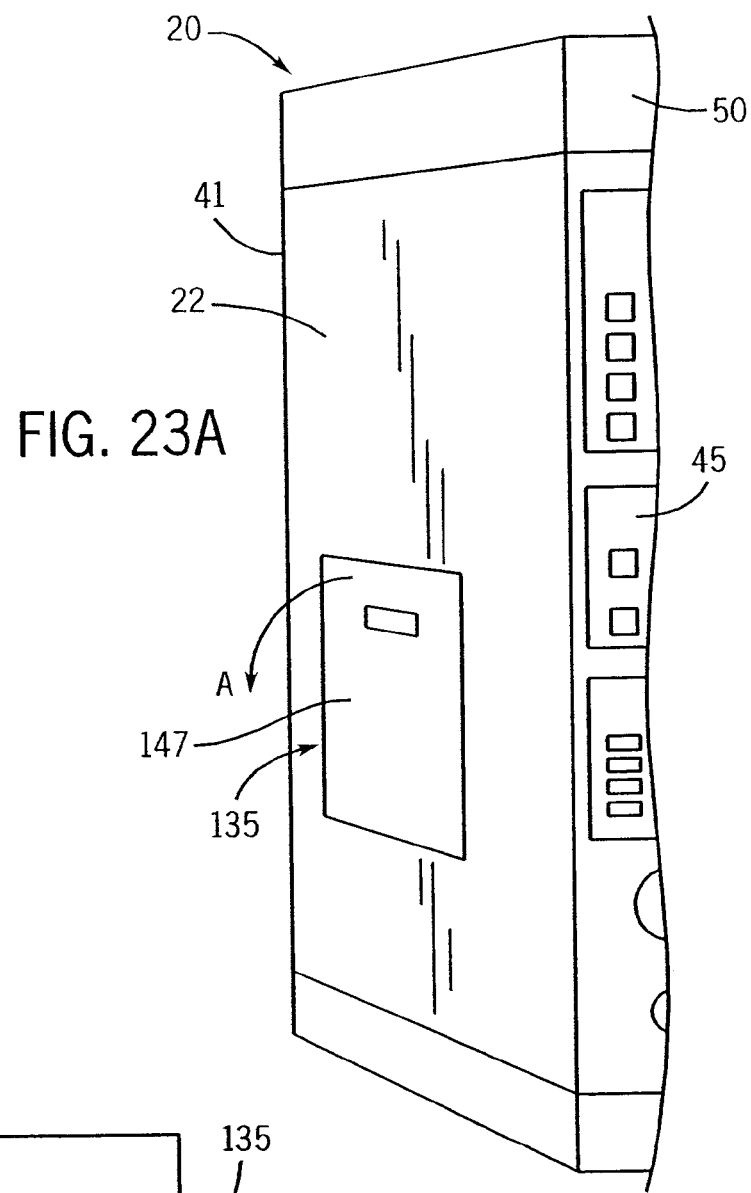
FIG. 23A is a perspective view of an oven including a steam-producing water tank constructed in accordance with an alternate embodiment of the invention.
Figure 23B:
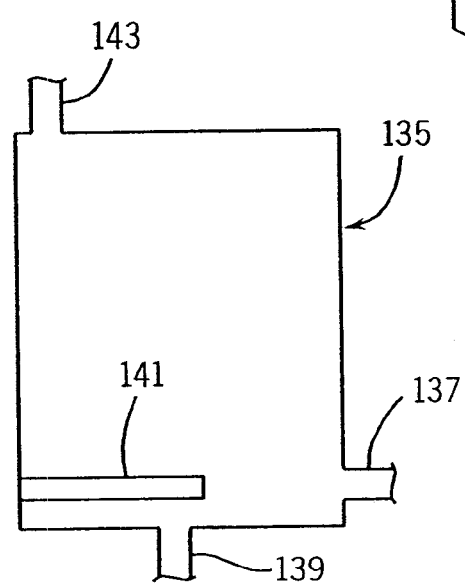
FIG. 23B is a schematic side elevation view of the water tank illustrated in FIG. 23A.

Referring now to FIGS. 23A-B, the present invention recognizes that an alternative to steam assembly 92 can be provided by including a steam generating water tank 135 that is either located external to the oven 20, or mounted inside cabinet 41. In particular, water tank 135 is formed in left side wall 22 (or alternatively rear wall 32) and includes a door 147 that can be opened in the direction of Arrow A to provide access to the interior of tank 135. Water tank 135 includes a supply input 137 that receives water from an external faucet (not shown) and a drain 139 for expelling excess water as necessary. A heating element, such as resistive coil 141 extends into tank 135 proximal the base and is operable to heat the stored water to boiling temperature. A steam conduit 143 extends from the upper wall of tank 135 and directs the generated steam into cavity 36 and, optionally, towards fan 98 to assist in steam circulation. It should be understood that water tank 135 can be used to replace steam assembly 92 in accordance with any of the embodiments described herein.

It should be further appreciated that steam-producing water tank 135 can be provided in oven 20 in combination with pressure compensation tank 124 in the manner described above to maintain a closed food preparation system. It should also be appreciated that steam-producing water tank 135 can be provided in combination with smoker assembly 62.

Oven 20 can thus include convection heating assembly 90, alone or in combination with steam producing assembly 92 and/or tank 135, and smoker assembly 62, any one of which being selectively operable to prepare food product 46, both alone and in combination.

Figure 11:
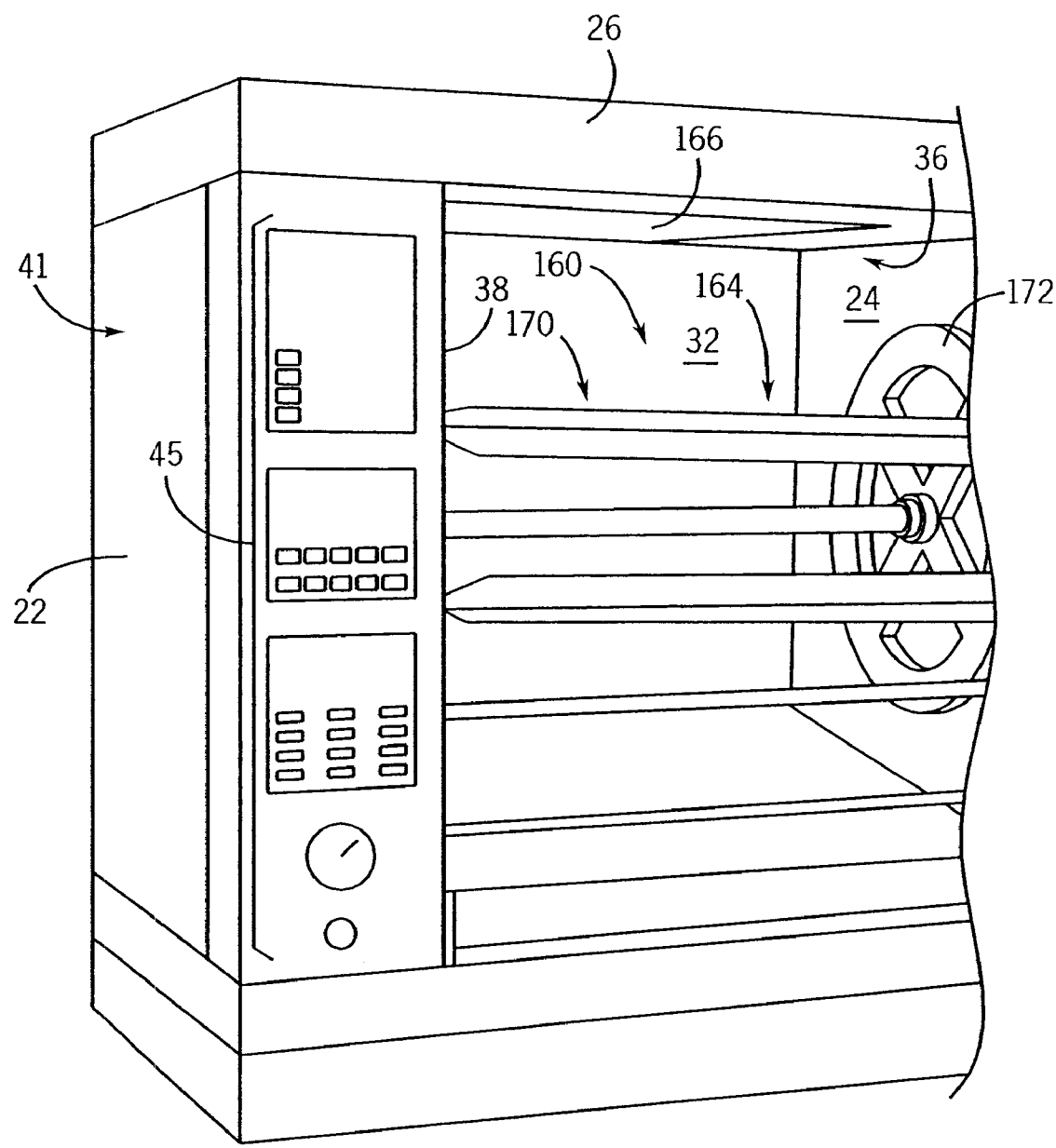
FIG. 11 is a perspective view of the oven illustrated in FIG. 1 having a rotisserie assembly installed in accordance with an alternate embodiment of the invention.

Referring now to FIG. 11, the present invention recognizes that oven 20 can include a rotisserie assembly 160 capable of preparing food product 46 using a radiation heat source in accordance with an alternate embodiment. While only the rotisserie assembly 160 is illustrated, the present invention anticipates that assembly 160 can be installed in oven 20 along with either or all of convection heating assembly 90, steam producing assembly 92 and/or tank 135, and smoker assembly 62.

Figure 22:
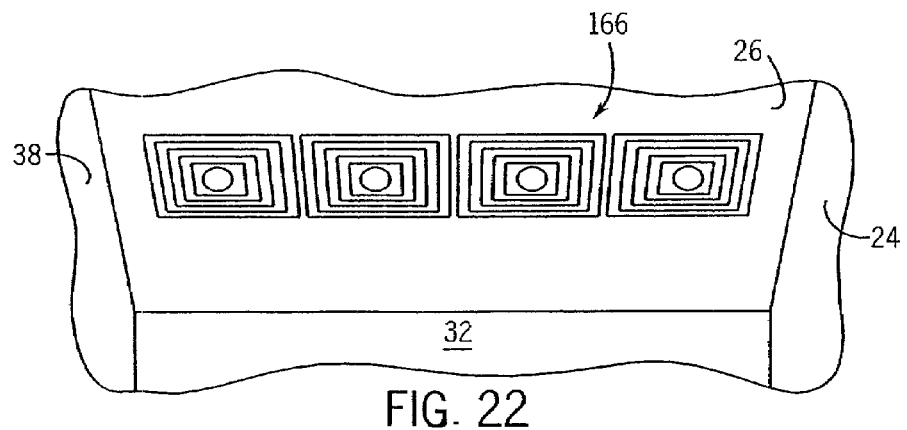
FIG. 22 is a perspective view of the upper wall of the cooking chamber illustrating the radiation heating elements of the rotisserie assembly.

Rotisserie assembly 160 includes a motor 162 (See FIG. 12) that drives a spit assembly 164. Referring also to FIG. 22, assembly 160 includes a radiating heat source 166 disposed directly above spit assembly 164 and supported by upper wall 26 inside heating cavity 36. Heat source 166 includes a plurality of rectangular ceramic disks that surrounds traditional resistive coils. The bottom of the coil (when positioned as installed in the heating cavity 36) is essentially coated with a ceramic material which has been found to emit infrared heat that is less scattered compared to coils that are not embedded in ceramic. The food product is thus browned more uniformly than conventionally achieved. The coils are connected via electrical leads to control 45, and emit heat in response to an electrical current. The ceramic heaters are preferably of the type commercially available from OGDEN Corp, located in Arlington Heights, Ill. or Chromalox, Inc. located in Pittsburgh, Pa.

Figure 18:
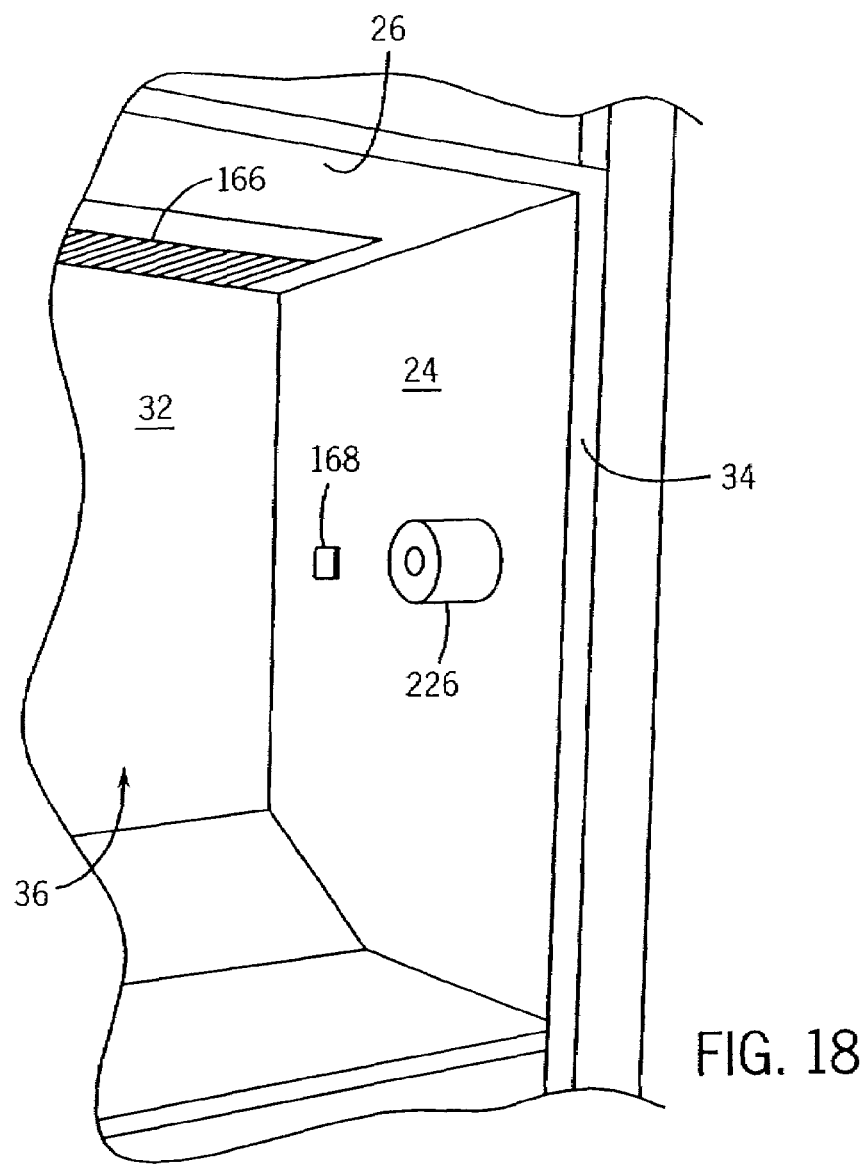
FIG. 18 is a perspective view of a portion of the cooking chamber illustrating a bearing that engages the driven end of the power transfer shaft illustrated in FIGS. 16 and 17.

The motor 162 and heating source 166 are operated via controls 45. A temperature sensor 168 (See FIG. 18) is mounted onto the right side wall 24 for sensing the temperature in heating cavity 36. The temperature may be displayed at the user controls 45, which includes a set of outputs as understood by a skilled artisan.

Figure 20:
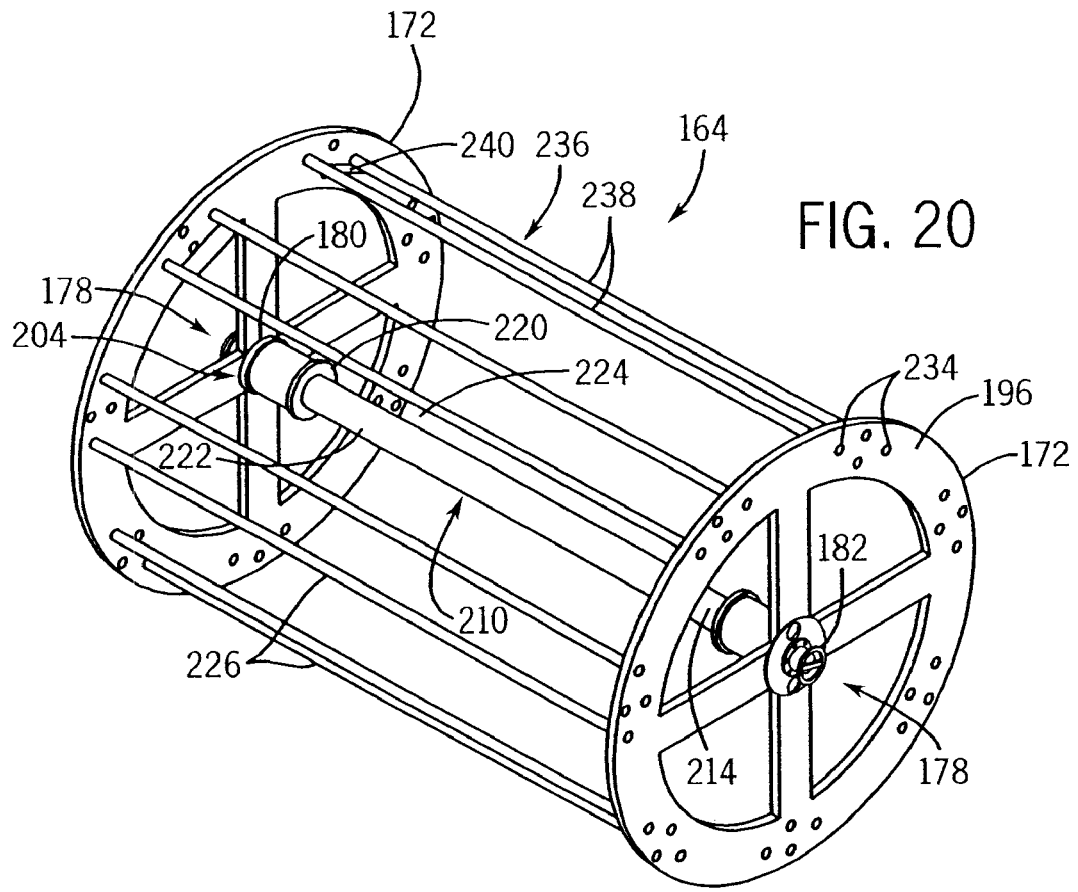
FIG. 20 is a perspective view of a spit assembly having a plurality of angled spits and dual pronged spits mounted in accordance with a preferred embodiment of the invention.
Figure 21:
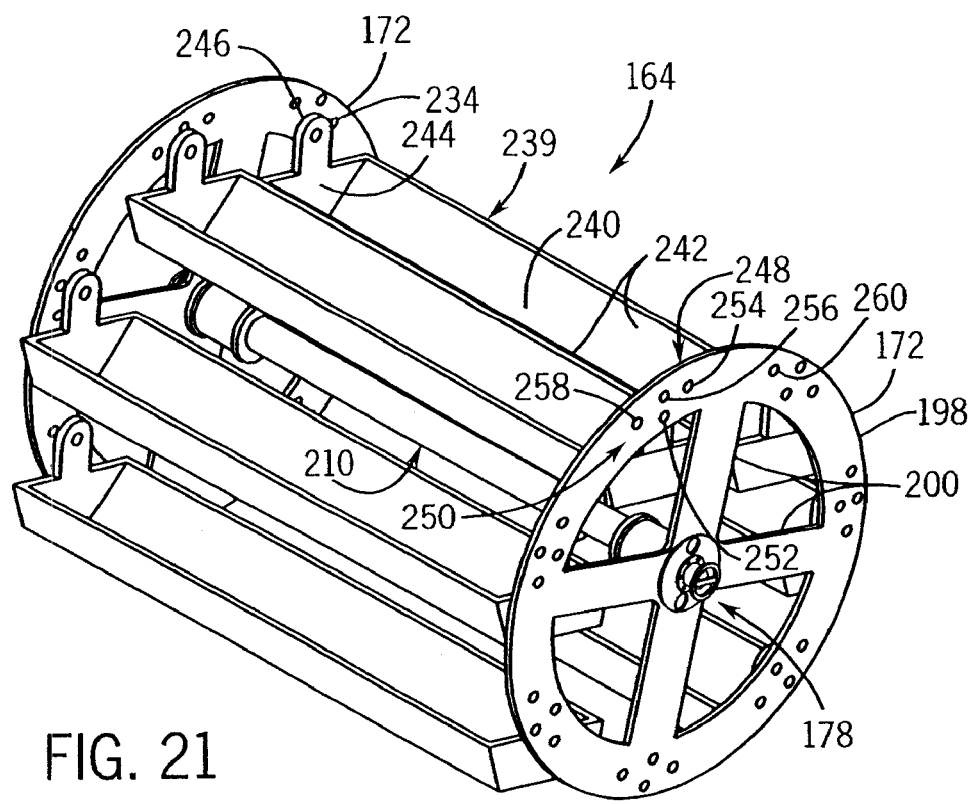
FIG. 21 is a perspective view of the assembled spit assembly illustrated in FIG. 20 having a plurality of baskets mounted in accordance with a preferred embodiment of the invention.

Referring also to FIGS. 20 and 21, rotisserie assembly 160 further includes a spit assembly 164 having a plurality of spits (collectively identified as 170) that can span between side walls 24 and 38 of the cavity 36. Specifically, spits 170 span between a pair of support discs 172 and are suitable for supporting food product 46 such as chicken, turkey, duck, and the like. Discs 172 are rotated under power supplied by motor 162.

Figure 12:
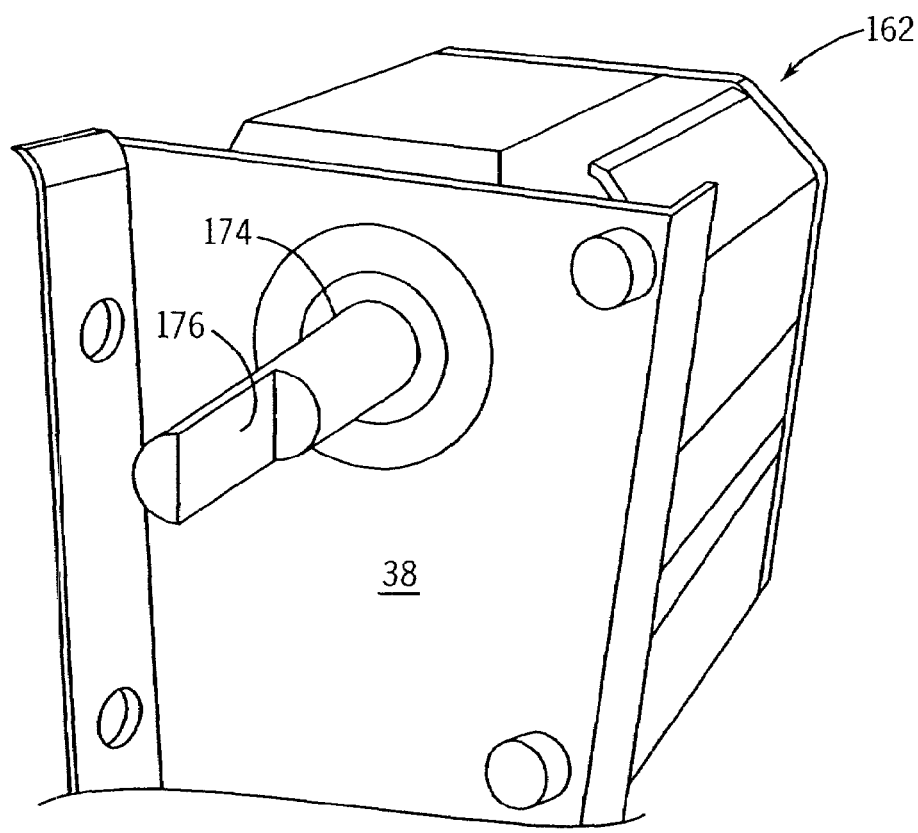
FIG. 12 is a perspective view of a motor that drives the spit assembly illustrated in FIG. 11.

The construction of spit assembly 164 will now be described. Specifically, as illustrated in FIG. 12, a rotating output shaft 174 extends outwardly from motor 162 and through left side wall 38 of the heating cavity 36 when installed in the oven 20. The outer end of shaft 174 includes an elongated groove 176 that bifurcates the shaft.

Figure 13:
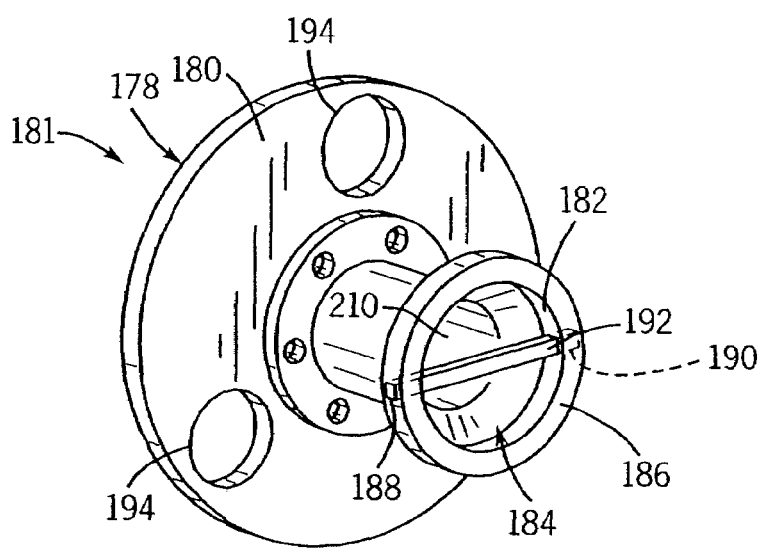
FIG. 13 is a perspective view of a coupling that engages the motor illustrated in FIG. 12.

Referring to FIG. 13, a coupling 178 is provided that interfaces with output shaft 174. Coupling 178 includes a cylindrical mounting plate 180 and a shaft portion 182 extending outwardly from the mounting plate to form a motor connector 181. A bore 184 is formed in the outer end 186 of the shaft portion 182. Opposing apertures 188 and 190, extend through shaft portion 182 proximal the terminal end, either or both of which may receive a dowel 192. The inner diameter of outer end 186 is slightly greater than the outer diameter of output shaft 174, such that the output shaft 174 is received by outer end 186. Specifically, dowel 192 engages groove 176 to interlock the coupling 178 with the output shaft 174, such that coupling 178 rotates along with output shaft 174 during operation. The mounting plate portion 180 of coupling 178 includes a plurality of apertures 194 extending axially therethrough.

Figure 14A:
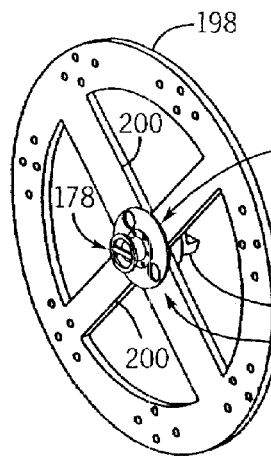
FIG. 14A is a perspective view of a disc that is connected to the coupling illustrated in FIG. 13.
Figure 14B:
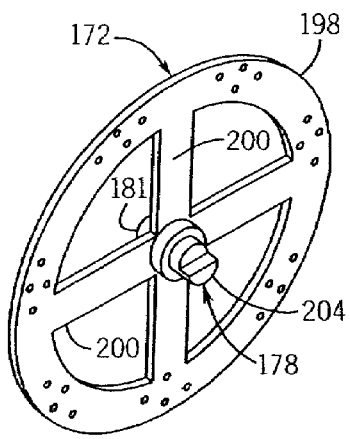
FIG. 14B is another perspective view of the disc illustrated in FIG. 14A.
Figure 15:
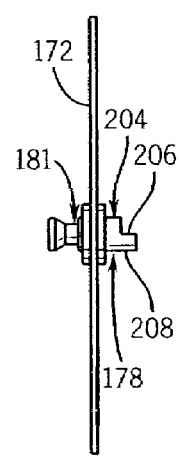
FIG. 15 is a side elevation view of the disc illustrated in FIGS. 14A-B.

Referring now to FIGS. 14A-B and 15, disc 172 includes an annular outer ring portion 198 and a pair of intersecting perpendicular ribs 200 that are connected at their outer ends to ring portion 198. Ribs 200 intersect at a hub 202 which is centrally disposed on disc 172. A pair of discs 172 are provided in accordance with the preferred embodiment, one of which being disposed at the drive end of the spit assembly 164, the other of which being disposed at the driven end of the assembly.

Coupling 178 is mounted onto the outer surface of hub 202 via bolts (not shown) extending through apertures 194 such that dowel 192 faces outwardly and engages the motor 162 as described above. A shaft connector 204 extends from hub 202 in a direction opposite from the direction of coupling 178 extension. Connector 204 is generally cylindrical, and defines an outer end that defines a flat axially extending engagement surface 206 as described above with reference to motor shaft 174. Outer end of surface 206 is connected to a round member 208 that is in the shape of a half-cylinder.

Figure 16:
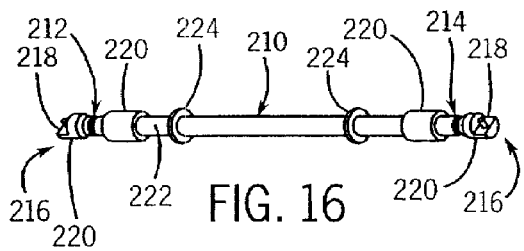
FIG. 16 is a perspective view of a power transfer shaft that transfers power between a drive disc and a driven disc of the spit assembly.
Figure 17:
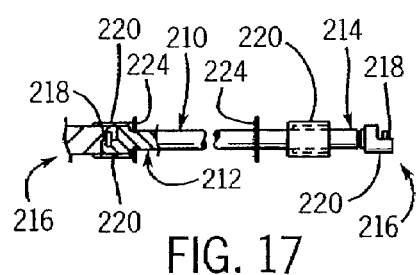
FIG. 17 is a sectional side elevation view of the shaft illustrated in FIG. 16.
Figure 19:
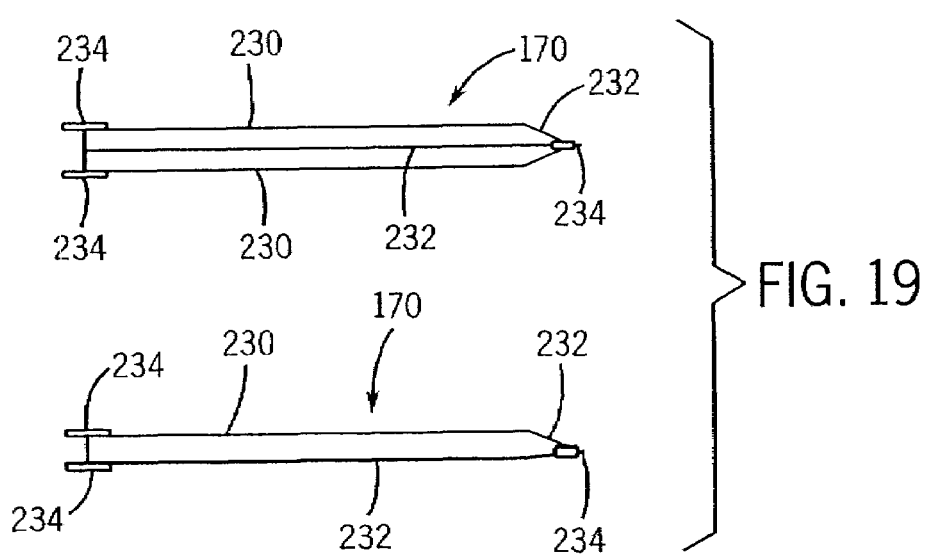
FIG. 19 presents various views of an angled spit that form a part of the preferred embodiment of the invention.

Referring now to FIGS. 16, 17, and 19, a power transfer shaft 210 includes a first end 212 disposed proximal the motor, and a second distal end 214 opposite the first end 212 that is disposed remote from the motor and proximal the right side wall 24 of healing cavity 36. The shaft 210 is symmetrical with respect to both ends 212 and 214, hence only proximal end 212 is described herein. Specifically, a connector 216 is disposed at the outer end that includes an axially extending flat surface 218 formed in a half-cylindrical surface 220. The flat surface 218 is configured to engage flat surface 206 of connector 204, such that the connector 204 and connector 216 rotate together when connected.

A collar 220 is disposed on shaft 210 having an internal bore shaped to mate with the outer surface of the cylindrical joint formed between connectors 204 and 216. Collar 220 is thus slid over the joint to secure the connector 216 to the coupling 204. End 212 presents a radial groove 222 that is disposed inwardly of the collar 220 (once placed in engagement with the joint) as illustrated in FIGS. 20 and 21. A locking ring 224 is slid into engagement with the groove 222 to prevent the collar 220 from sliding out of engagement during operation. Distal end 214 is also joined to connector 204 of a disc 172 in the manner described Referring to FIG. 18, the coupling 178 that is connected to the driven end of shaft 210 is further connected to a cylindrical bearing 226 extending into the heating cavity 36 from right side wall 24. Bearing 226 includes a rotating connector member defining a groove that receives dowel 192 to lock the coupling 178 to the bearing 226 with respect to rotational motion.

Referring to FIGS. 20-21 spit assembly can be conveniently assembled and disassembled as desired. During assembly, the couplings 178 are first mounted onto hubs 202 of discs 172 in the manner described above. The shaft portions 182 of couplings 178 are then connected to motor 162 and bearing 226, respectively. The shaft 210 is then installed, such that ends 212 and 214 are connected to the shaft connectors 204 as described above. The spit assembly 164 may be disassembled by reversing the assembly process, for instance when it is desired to clean the heating cavity 36.

Referring also to FIGS. 19-21, spit assembly 164 is illustrated having various spits 170 extending between the discs 172 that are selectively usable depending on the food product to be prepared. In particular, a first angled spit 228 (FIG. 19) includes a pair of elongated axially extending flat walls 230 that join at an axially extending apex 232 to assume the general shape of an elongated bracket. Walls 230 define a pointed end 232 that is disposed at one end of spit 228. A mounting pin 234 extends outwardly from the pointed end 232. The other end of the spit 228 includes a pair of mounting pins 234 extending outwardly (one from each wall 230).

A second dual-prong spit 236 (FIG. 20) includes a pair of cylindrical skewer rods 238 that are joined by a rib 240 at one end. A mounting pin 234 extends outwardly from either end of each rod 238. The mounting pins 234 are disposed remote from rib 240 may be pointed to assist in piercing uncooked food product. Mounting pins, 234 of spit 236 are spaced apart the same distance as mounting pins 234 of spit 228.

A third spit is a basket 239 (FIG. 21) that includes an axially elongated base 240 integrally connected to opposing side walls 242 that are angled outwardly with respect to the base. A pair of opposing end walls 244 closes the basket 239. Food product sits in the basket 239 during operation. A slot or plurality of slots (not shown) extends axially between the base 240 and side walls 242 to assist in the drainage of grease that is produced during the preparation of the food product. A mounting flange 246 extends upwardly from each end wall 244, and supports a mounting pin 234 that extends outwardly from the flange 246. Mounting pins 234 enable rotation of the corresponding spit 170.

Discs 172 define a plurality of spit mounting locations 248 located at the outer ring portion 198 and radially offset from each other (seven illustrated). Each mounting location 248 includes two pairs of apertures designed to receive mounting pins 234. In particular, a first pair of apertures 250 includes first and second radially aligned apertures 252 and 254, respectively. First aperture 252 is disposed radially inwardly with respect to second aperture 254. A second pair of apertures 256 includes tangentially aligned apertures 258 and 260.

Apertures 258 and 260 are designed to receive mounting pins 234 of the dual-pronged ends of spits 228 and 236. Apertures 252 and 254 are designed to receive mounting pins 234 of the single-pronged ends of spits 228 and 239. Advantageously, for larger food product, spit 228 may be orientated with the single mounting pin 234 of the pointed end 232 in the radially outer aperture 254. In this first configuration, the apex 234 points radially inwardly to position the food product away from the radiating heat elements, as will be described below. Alternatively, for smaller food product, mounting pin 234 of the pointed end 232 may be positioned in the radially inner aperture 252 such that apex 232 faces outwardly, thereby positioning the food product closer to the radiating heat elements. Sufficient clearance exists such that one end of the spits may be translated close to the corresponding disc 172 to free the mounting pins 234 at the other end of the spit from the opposite disc 172. Accordingly, spits may be easily attached to and removed from assembly 164.

Oven 20 thus advantageously incorporates a convection heat source 90 alone or in combination with a steam production assembly 92 (with or without tank 135) that can be used to cook raw food product along with, or separately from, a radiation heat source 176 that browns the food being prepared. Any of heating assemblies 90, 92, or 176 can be used in combination with, or separately from, smoker assembly 62 to add additional smoked flavor to food product 46.

Advantageously, food product 46 may be heated via convection, steam, and/or radiation while at the same time activating smoker assembly 62. Accordingly, the length of time necessary to prepare the food product 46 is significantly less than conventional smoking assemblies, and is more convenient that cooking a raw food product in a first oven, then transferring the food product to a smoker oven. Furthermore, the food product 46 is not being handled twice, thereby reducing the likelihood that the food will become contaminated. Moreover, the food product 46 will absorb a larger amount of flavorful smoke when it is raw (and being cooked) as opposed to when it has been cooked before introducing flavored smoke. The food product 46 can also be prepared via only convection, steam and/or radiation in situations where smoking is not desired. All of these food preparation operations can be initiated using controls 45 as appreciated by one having ordinary skill in the art.

It should further be appreciated that oven 20 is more versatile than conventional ovens in that a meat product can be prepared using any of the heating methods described above in combination with smoker 62. However, once the meat is fully prepared and removed from cavity 36, the smoke is also expelled and oven 20 can then be used to prepare food product that does not require smoking, for example vegetables, without exposing the vegetables to the smoke that was produced during the previous cooking cycle. Oven 20 can therefore prevent the transfer of smoke flavor between cooking cycles. It should furthermore be appreciated that steam assembly 92 can be activated to produce steam when it is desired to clean cavity 36.

It should be appreciated that controls 45 include timers and temperature controls to automatically initiate various cooking sequences at various temperatures for predetermined lengths of time. The timer and temperature controls can be applicable to any of the heating assemblies described herein, and furthermore can operate different heating assemblies either simultaneously or concurrently.

The above description has been that of the preferred embodiment of the present invention, and it will occur to those having ordinary skill in the art that many modifications may be made without departing from the spirit and scope of the invention. In order to apprise the public of the various embodiments that may fall in the scope of the present invention, the following claims are made.

We claim:

1. A combination oven capable of preparing food product, the combination oven comprising:
   a heating cavity defining an interior including an apparatus for supporting food product disposed therein;
   a door providing selective access to the interior;
   a first food preparation assembly comprising a steam assembly selectively providing steam into the interior to prepare food and a heat assembly selectively heating the interior to prepare food using at least one of radiating heat and forced air convection, the heat assembly comprising a heating element disposed in the heating cavity and an air mover capable of forcing incoming air across the heating element to produce heated air that is delivered to the interior of the heating cavity, the steam assembly comprising a steam producing assembly capable of delivering liquid across the heating element that transforms the liquid into steam that is delivered to the interior of the heating cavity; and
   a smoking assembly selectively delivering smoke into the interior independently of the first food preparation assembly; and a drain system configured to drain liquids produced during food preparation from the interior while preventing gasses from escaping from the interior when the interior is pressurized below a threshold pressure.

2. The combination oven as recited in claim 1, wherein the heating cavity is configured to be a closed system so that air inside the heating cavity is not continuously in direct communication with air outside the combination oven.

3. The combination oven as recited in claim 1, wherein the heating element is selected from a group consisting of a resistive member that produces heat upon receiving an electric current to produce heated air and a heat exchanging tube delivering combustion gasses from a burner to produce heated air.

4. The combination oven as recited in claim 1, wherein the steam producing assembly comprises a fluid supply source coupled to a conduit that delivers fluid from the source to the air mover.

5. The combination oven as recited in claim 4, wherein the steam producing assembly further comprises an atomizer that receives the fluid from the conduit and directs the fluid of the heating element under centrifugal forces provided by rotation of the air mover.

6. The combination oven as recited in claim 1, wherein the smoking assembly comprises an ignition member extending into a container that houses an aromatic smoke producing media and contains at least one vent for emitting smoke, the ignition member extending into the aromatic smoke producing media and configured to deliver heat to the aromatic smoke producing media so that the aromatic smoke producing media emits smoke into the heating cavity.

7. The combination oven as recited in claim 6, wherein the ignition member produces heat by one of an element that produces heat in response to an electric current and a momentary spark or flame sufficient to cause the aromatic smoke producing media to produce smoke.

8. A method of preparing a food product in an combination oven having a heating cavity defining an interior including an apparatus for supporting food product disposed therein, a first food preparation assembly comprising a steam assembly operable to prepare raw food using steam and a heating assembly operable to prepare raw food using at least one of radiating heat and forced air convection, the heat assembly including a heating element disposed in the heating cavity, and a smoking assembly extending into the interior and configured to deliver smoke to the interior, the combination oven configured to operate the smoking assembly independent of the first food preparation assembly, the steps comprising:

enclosing the food product in the interior of the heating cavity;

heating the food product using a food preparation process comprising by operating at least one of the steam assembly and the heating assembly;

selectively operating the smoking assembly at one of at the same time as the first food preparation process and at a different time than the first food preparation process; and draining liquids produced during food preparation from the interior while preventing gasses from escaping from the interior when the interior is pressurized below a threshold pressure.

9. The method as recited in claim 8, in which the heating cavity is configured to be a closed system so that air inside the heating cavity is not continuously in direct communication with air outside the oven, and the method further comprises venting gasses from the interior when the interior is pressurized to a level greater than the threshold pressure.

10. The method as recited in claim 8, further comprising cooling and liquefying some of the gasses prior to removing liquefied gas from the cavity.

11. The method as recited in claim 8, wherein operating the steam assembly further comprises delivering a fluid across the heating element that transforms the fluid into steam that is delivered to the interior.

12. The method as recited in claim 11, wherein operating the steam assembly further comprises providing the fluid to an atomizer that directs the fluid over the heating element under centrifugal forces provided by rotation of the air move.

* * * * *

(12) INTER PARTES REEXAMINATION CERTIFICATE (0398th)
United States Patent
Bartelick et al.

(10) Number: US 7,317,173 C1
(45) Certificate Issued: *Jun. 26, 2012

(54) OVEN INCLUDING SMOKING ASSEMBLY IN COMBINATION WITH ONE OR MORE ADDITIONAL FOOD PREPARATION ASSEMBLIES

(75) Inventors: Janus Bartelick, Brown Deer, WI (US); William J. Hansen, Pewaukee, WI (US); Patrick A. Willis, Glendale, WI (US)

(73) Assignee: Alto-Shaam, Inc., Menomonee Falls, WI (US)

Reexamination Request:
No. 95/001,465, Dec. 17, 2010

Reexamination Certificate for:
Patent No.: 7,317,173
Issued: Jan. 8, 2008
Appl. No.: 11/468,678
Filed: Aug. 30, 2006

( * ) Notice: This patent is subject to a terminal disclaimer.

Related U.S. Application Data

(63) Continuation of application No. 10/914,880, filed on Aug. 9, 2004, now Pat. No. 7,157,668.
(60) Provisional application No. 60/493,697, filed on Aug. 8, 2003.

(51) Int. Cl.
*A21B 1/24* (2006.01)
*A21B 1/26* (2006.01)
*A23B 4/044* (2006.01)
*A23B 4/056* (2006.01)
*A23L 1/31* (2006.01)

(52) U.S. Cl. ......................... 219/401; 126/20; 126/21 A; 219/411; 99/467; 99/474; 99/482

(58) Field of Classification Search ..................... None
See application file for complete search history.

(56) References Cited

To view the complete listing of prior art documents cited during the proceeding for Reexamination Control Number 95/001,465, please refer to the USPTO's public Patent Application Information Retrieval (PAIR) system under the Display References tab.

*Primary Examiner* — Patricia Engle

(57) ABSTRACT

An oven is disclosed having a first food preparation apparatus in the form of a convection heat source and/or a steam production assembly and/or a radiating heat source, and a second food preparation apparatus in the form of a smoking assembly. The oven can operate at least one of the food preparation apparatus simultaneously with the smoking assembly or separately from the smoking assembly.

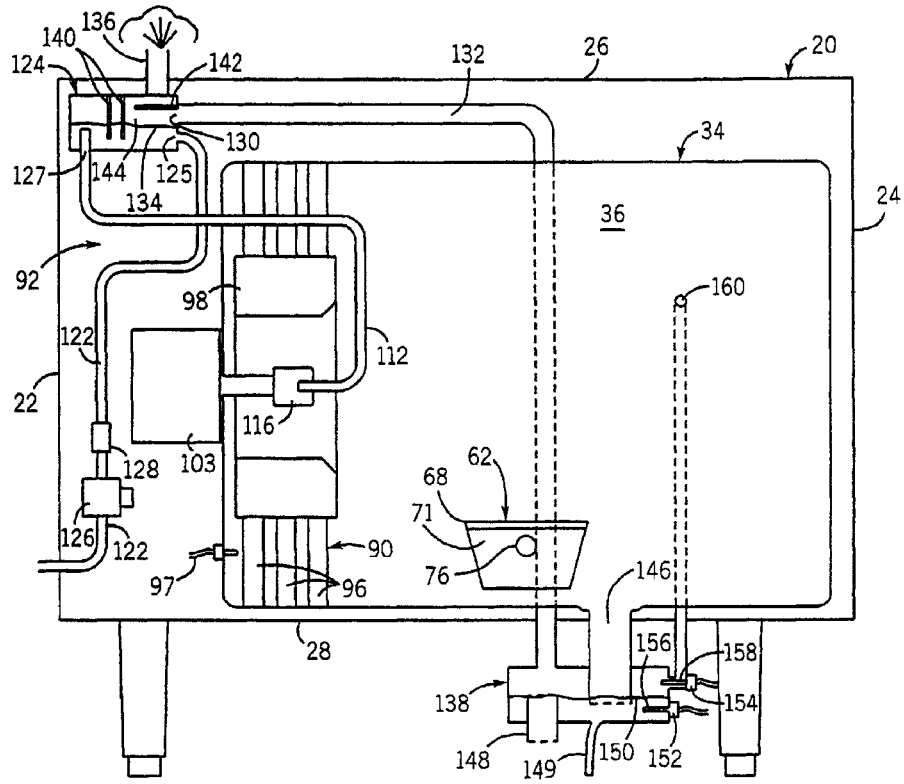

INTER PARTES REEXAMINATION CERTIFICATE ISSUED UNDER 35 U.S.C. 316

THE PATENT IS HEREBY AMENDED AS INDICATED BELOW.

AS A RESULT OF REEXAMINATION, IT HAS BEEN DETERMINED THAT:

Claim 1 is cancelled.
Claims 2-12 were not reexamined.

\* \* \* \* \*